US008050986B2

(12) United States Patent
Moeller

(10) Patent No.: US 8,050,986 B2
(45) Date of Patent: Nov. 1, 2011

(54) SYSTEM AND METHOD FOR DETERMINING A QUANTITY MISMATCH REPORT

(75) Inventor: Thomas F. Moeller, Weilerswist (DE)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1456 days.

(21) Appl. No.: 11/482,532

(22) Filed: Jul. 7, 2006

(65) Prior Publication Data

US 2008/0021797 A1 Jan. 24, 2008

(51) Int. Cl.
*G06F 17/50* (2006.01)
(52) U.S. Cl. .............................. 705/29; 705/26.5; 705/28
(58) Field of Classification Search .................... 705/29, 705/26.5, 28
See application file for complete search history.

(56) References Cited

U.S. PATENT DOCUMENTS

| 5,434,794 | A * | 7/1995 | Coudert et al. ............... 716/132 |
| 7,219,319 | B2 * | 5/2007 | Gould et al. ..................... 326/46 |
| 7,735,027 | B2 * | 6/2010 | Moeller et al. ................ 716/100 |
| 2002/0143754 | A1 | 10/2002 | Paulley | |
| 2002/0169587 | A1 * | 11/2002 | Emek et al. ........................ 703/2 |
| 2006/0190852 | A1 * | 8/2006 | Sotiriou ............................ 716/3 |

FOREIGN PATENT DOCUMENTS

| WO | WO 0013115 A1 | 3/2000 |
| WO | WO2008005553 A | 1/2008 |
| WO | WO2008005566 A | 1/2008 |

OTHER PUBLICATIONS

International Search Report for PCT/US2007/015668 Dated Nov. 10, 2008.
Hong S.J. and Cain R. G. and Ostapko, D.L.: "Mini: A Heuristic Appraoch for Logic Minimization" IBM Journal of Research and Development, vol. 59, Nol. 18, Sep. 1974.
Se June Hong: "R-Mini: An Interative Approach for Generating Minimal Rules From Examples" IEEE Transactions on Knowledge and Data Engineering, vol. 9, No. 5, Oct. 1997.
Debnath D et al: "GRMIN2: A Heuristic Simplification Algorithm for Generalised Reedmuller Expressions" IEEE Proceedings: Computers and Digital Techniques, IEEE, GB, vol. 143, No. 6, Nov. 25, 1996.
Arce-Nazario R A et al: "Integer Pair Representation for Multiple-Output Logic" Midwest Symposium on Circuits and Systems. Cairo Egypt, Dec. 27-30, 2003.

* cited by examiner

*Primary Examiner* — Ramsey Refai

(57) ABSTRACT

A system, method, and computer program for determining a quantity mismatch report so that a plurality of configured quantities for a plurality of product variants can be compared. The method includes transforming a plurality of logical expressions. The method also includes detecting a quantity mismatch report from said transformed logical expressions. The method further includes determining at least one product variant from the quantity mismatch report.

17 Claims, 10 Drawing Sheets

SYSTEM AND METHOD FOR DETERMINING A QUANTITY MISMATCH REPORT

TECHNICAL FIELD

This invention relates generally to bill of materials solutions. More specifically, the invention relates to a system and method of determining a quantity mismatch report.

BACKGROUND

The computer has greatly affected essentially all forms of information management, including the process of managing the entire lifecycle of a product from its conception, through design and manufacture to service and disposal. The term for this process is Product Lifecycle Management, or PLM. It is a cornerstone of a corporation's IT digital structure. One of the features of PLM is to collect knowledge that can be reused for other projects and to coordinate concurrent development of many products. PLM can also include the coordination of and management of product definition data, including configuring product variations. The management of product definition data involves managing that product's bill of materials. The bill of materials, or BOM, describes the product in a tabular format and in terms of its assemblies, sub-assemblies, and basic components and parts. The BOM is a subset of a larger bill of information concept which can enumerate information that is related to a product or a process and provide sufficient information as it is designed, manufactured, ordered, built, maintained, and/or processed.

Referring to product design and development, when a product is designed as a generic product family, it has to be configured to a specific product variant or product variant family for almost every business process throughout the entire product life cycle. Every manufactured product instance, every physical or digital prototype, every analysis or simulation, is based on a specific product variant configuration. Throughout the product development process, various disciplines produce generic product representations that model the product as a generic product family and can be configured to a specific product variant or product variant family. However, each discipline, e.g., part BOM, CAD, or Manufacturing Engineering, uses different product representations with different level of detail regarding variant configuration. A part BOM usually creates variant configuration data specifying all product variants a given part usage is necessary for. CAD requires additional variant data that specifies position and deformation (e.g. of a hose) of the geometry representing a given part usage in the part BOM. Manufacturing Engineering needs even more variant data specifying the assembly process of the specific position and shape in a given part usage. For example, a robot may need to deform and position a flexible hose in many different ways, depending on product components that may cross the robot path.

The growing complexity of product configurations has made it very difficult to determine whether instances that were mapped between two product representations, e.g., CAD structure and part BOM, cover the same quantity. For example, it is not predictable how many positioned design instances of a wheel are necessary to completely map to the wheels in the part BOM of a truck with dual tire option in two wheelbases, with optional spare tires. Depending on the CAD design and origin, anything between 11 and 17 design instances could be required, not including design instances representing deformations or articulated positions of the wheel.

There is a need for a solution for determining whether the instances that are mapped between different product representations completely align or show quantity mismatches.

SUMMARY

To achieve the foregoing, and in accordance with the purpose of the presently preferred embodiment as broadly described herein, the present application provides a method of determining a quantity mismatch report so that a plurality of configured quantities for a plurality of product variants can be compared, comprising the steps of transforming a plurality of logical expressions; detecting a quantity mismatch report from said transformed logical expressions; and determining at least one product variant from said quantity mismatch report. The method, wherein said transforming step comprises the step of subtracting a first logical expression from a second logical expression using a truth table, whereby a combination of lines in said truth table having a true expression is translated into a minterm table. The method, wherein said transforming step further comprises the step of minimizing said minterm table by calculating a plurality of prime implicants. The method, wherein said detecting step utilizes a prime implicant table in positional cube notation to identify a plurality of equivalent primitives.

An advantage of the presently preferred embodiment is to provide a computer-program product tangibly embodied in a machine readable medium to perform a method to determine a quantity mismatch report, comprising: instructions for transforming a plurality of logical expressions; instructions for detecting a quantity mismatch report from said transformed logical expressions; and instructions for determining at least one product variant from said quantity mismatch report. The computer-program product, wherein said transforming instructions comprises instructions for subtracting a first logical expression from a second logical expression using a truth table, wherein a combination of lines in said truth table having a true expression is translated into a minterm table. The computer-program product, wherein said transforming instructions further comprises instructions for minimizing said minterm table by calculating a plurality of prime implicants. The computer-program product, wherein said detecting instructions utilize a prime implicant table in positional cube notation to identify a plurality of equivalent primitives.

Another advantage of the presently preferred embodiment is to provide a data processing system having at least a processor and accessible memory to implement a method to determine, comprising means for transforming a plurality of logical expressions; means for detecting a quantity mismatch report from said transformed logical expressions; and means for determining at least one product variant from said quantity mismatch report.

And another advantage of the presently preferred embodiment is to provide a method of determining a quantity mismatch report comprising the steps of transforming a plurality of logical expressions, comprising the steps of: subtracting a first logical expression from a second logical expression using a truth table, whereby a combination of lines in said truth table having a true expression is translated into a minterm table; and minimizing said minterm table by calculating a plurality of prime implicants; detecting a quantity mismatch report from said transformed logical expressions using a prime implicant table in positional cube notation to identify a plurality of equivalent primitives and determining at least one product variant from said quantity mismatch report.

Other advantages of the presently preferred embodiment will be set forth in part in the description and in the drawings that follow, and, in part will be learned by practice of the invention.

The presently preferred embodiment will now be described with reference made to the following Figures that form a part hereof. It is understood that other embodiments may be utilized and changes may be made without departing from the scope of the present invention.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENT

Figure 1:
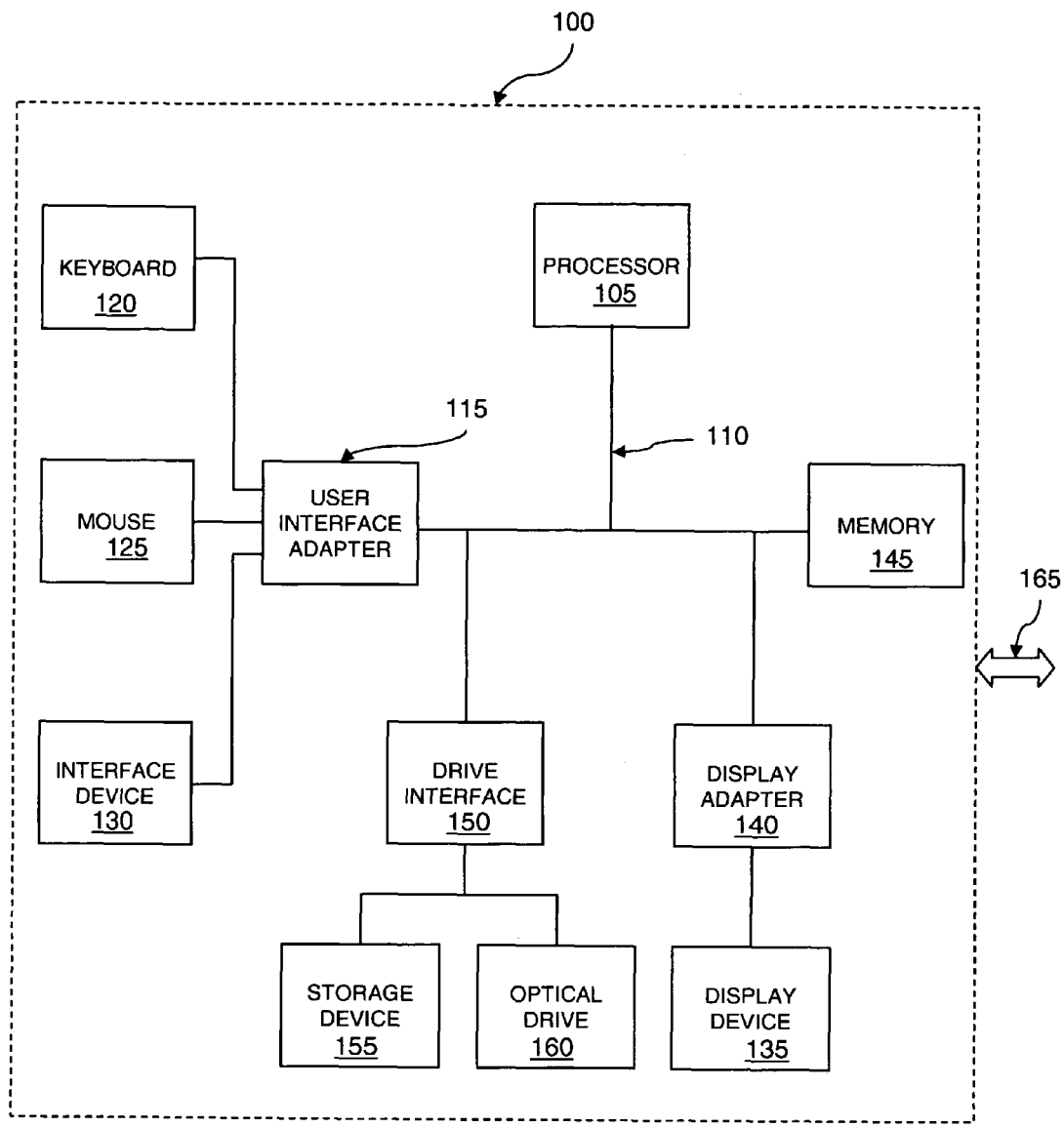
FIG. 1 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of determining a quantity mismatch report. Now in accordance thereof, an operating system executes on a computer, such as a general-purpose personal computer. FIG. 1 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

With reference to FIG. 1, an exemplary system for implementing the presently preferred embodiment includes a general-purpose computing device in the form of a computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The bus 110 may be any of several types of bus structures including a memory bus or memory controller, a peripheral bus, and a local bus using any of a variety of bus architectures. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 further includes a drive interface 150 that couples at least one storage device 155 and/or at least one optical drive 160 to the bus. The storage device 155 can include a hard disk drive, not shown, for reading and writing to a disk, a magnetic disk drive, not shown, for reading from or writing to a removable magnetic disk drive. Likewise the optical drive 160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 100.

The computer 100 can communicate via a communications channel 165 with other computers or networks of computers. The computer 100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Figure 2:
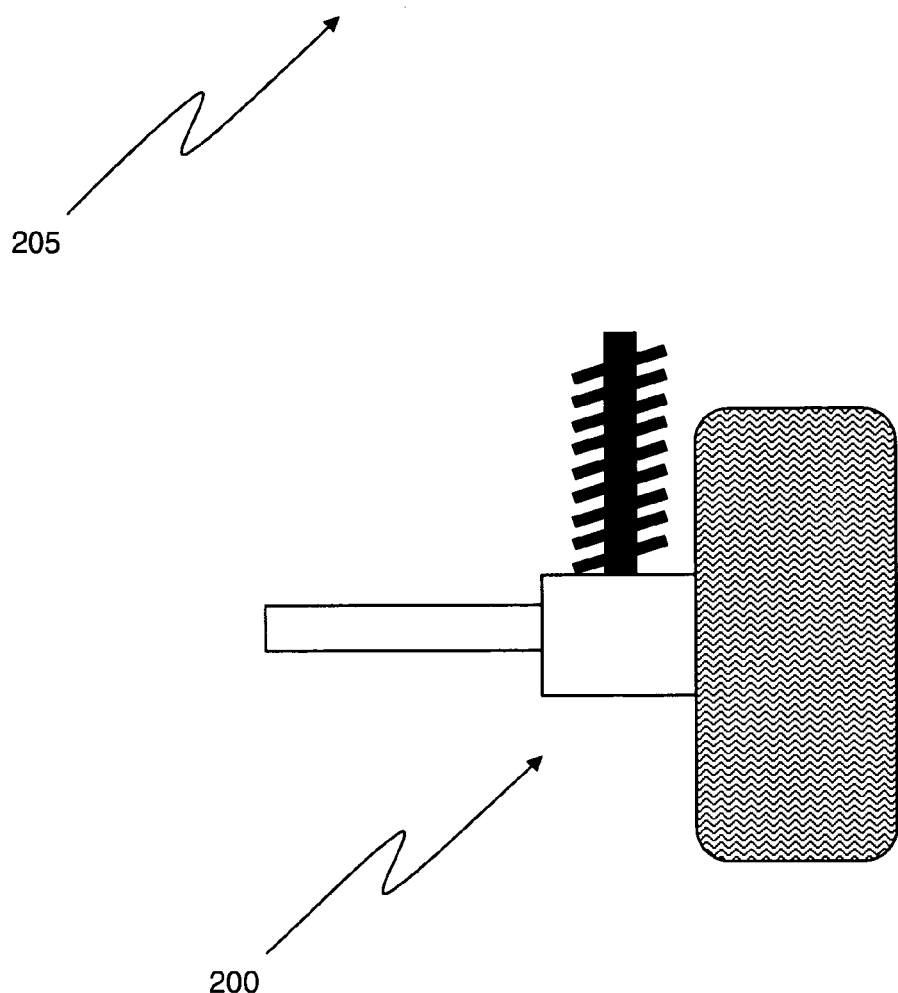
FIG. 2. is a bill of material with corresponding product.

Referring to FIG. 2, a content and a structure of a product 200 is described in a bill of material (BOM) 205 that lists a series of components 210 comprising the product 200. Each element of the BOM 205 describes a unique usage of a specific quantity of the components 210 in what is called a line of usage (LOU) 215. A boolean expression associated with the LOU 215 defines a variant condition under which the product 200 uses the component 210 with the quantity specified in the LOU 215, where the boolean expression combines one or more available product features or variant options. This boolean expression is called a usage condition.

The presently preferred embodiment determines whether the variant condition configuring a given instance quantity in one product representation is identical to the sum of the instances in the other product representation for the same configuration. Take the quantities in Table(s) 1 & 2, below, where a part count for the part BOM corresponds with a part count for the CAD structure, respectively, to

TABLE 1

Part Quantity Table

| Condition | Wheel Quantity in part BOM | Spare Tire | Dual Tire |
|---|---|---|---|
| C1 | 4 wheel parts | 0 | 0 |
| C2 | 5 wheel parts | 1 | 0 |
| C3 | 6 wheel parts | 0 | 1 |
| C4 | 7 wheel parts | 1 | 1 |

TABLE 2

CAD Quantity Table

| Condition | Wheel Quantity in CAD structure | Spare Tire | Dual Tire | Short Wheelbase | Long Wheelbase |
|---|---|---|---|---|---|
| C5 | 2 front wheel positions | — | — | — | — |
| C6 | 2 (inner) rear wheel positions | — | — | 0 | — |
| C7 | 2 (inner) rear wheel positions | — | — | — | 0 |
| C8 | 2 outer rear wheel positions | — | 1 | 0 | — |
| C9 | 2 outer rear wheel positions | — | 1 | — | 0 |
| C10 | 1 spare wheel position | 1 | — | 0 | — |

In the above tables we use the Positional Cube Notation (PCN) as follows: 1=YES, 0=NO, and "-"=Don't care. Provided that EQUATION 1 is satisfied, complete alignment exists.

$$\text{Part-Quantity}(C1) == \text{sum} \quad (\text{Position-Quantity}(C1*C5),$$
$$\text{Position-Quantity}(C1*C6),$$
$$\text{Position-Quantity}(C1*C7),$$
$$\text{Position-Quantity}(C1*C8),$$
$$\text{Position-Quantity}(C1*C9),$$
$$\text{Position-Quantity}(C1*C10))$$

Equation 1

$$C_M = C1 - C1*(C5+C6+C7+C8+C9+C10)$$

Equation 2

Given Equation 1, determine Equation 2 that specifies the condition for which positions there is a mismatch (either missing or too many) compared to the quantity required by the First Condition (C1). Put another way, for any $C_M$ != FALSE, we have a quantity mismatch. In order to determine $C_M$, subtract a logical expression (C1*(C5+C6+C7+C8+C9+C10)) from another logical expression (C1) utilizing a truth table in positional cube notation, where the combination of lines of the truth table, for which the expression is "TRUE" is called a minterm table. In order to achieve a best performance, it is desirable to minimize the minterm table.

Figure 3:
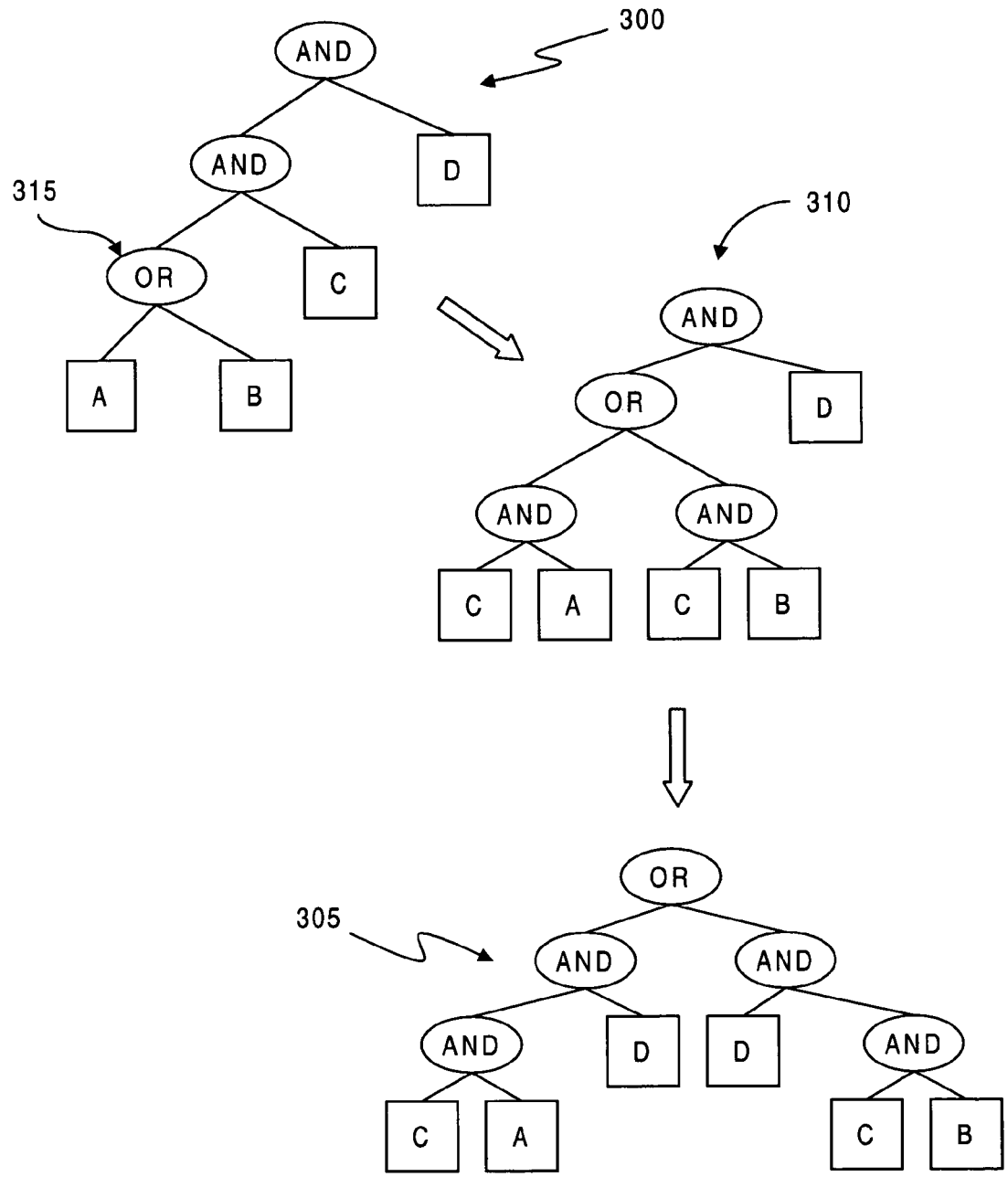
FIG. 3 is a dataflow diagram of the preferred embodiment.

Referring to FIG. 3, illustrating a method to minimize a logical expression. As shown in FIG. 3, the usage condition, e.g., ((A OR B) AND C) AND D) shown as a binary tree 300, can be converted into a DNF 305 by moving AND-nodes 310 down and OR-nodes 315 up. The usage condition is expressed in Disjunctive Normal Form (DNF), if it consists of a disjunction of conjunctions where no conjunction contains a disjunction, e.g., (a AND b) OR (b AND c) in pedantic notation. In Polish Notation, the DNF has the following form: $OR(t_1, t_2, \ldots, t_n)$, where all terms $t_1 \ldots t_n$ have the form AND $(l_1, l_2, \ldots, l_n)$. $L_1 \ldots l_n$ are literals each representing a single boolean variable, e.g., "color EQUAL green", or "NOT size EQUAL large."

The AND-nodes that need to moved down can be found by searching the binary tree for any AND-nodes having an OR-node as a child. The search can be implemented as a recursive function beginning at the top. If the search processes a node before processing its child, and if matching AND-nodes are appended to the end of a result tree, the final result tree will list all AND-nodes to be moved down in reverse order in which they need to be processed. The aforementioned process of recursively traversing a binary tree is well-known to those skilled in the art and will not be addressed with further detail.

Figure 4:
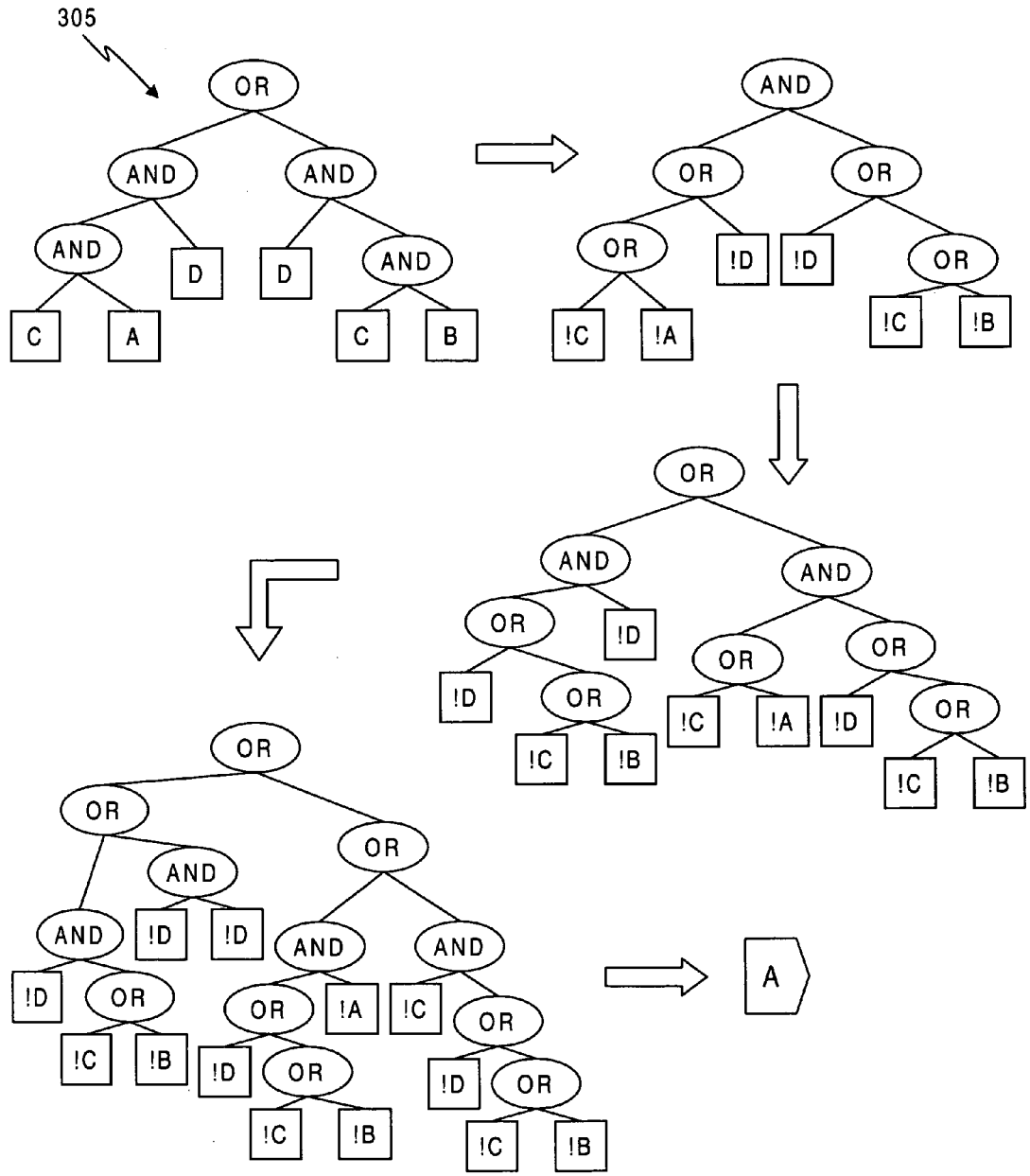
FIG. 4 illustrates a process of transforming a binary tree boolean expression into a normal form.
Figure 5:
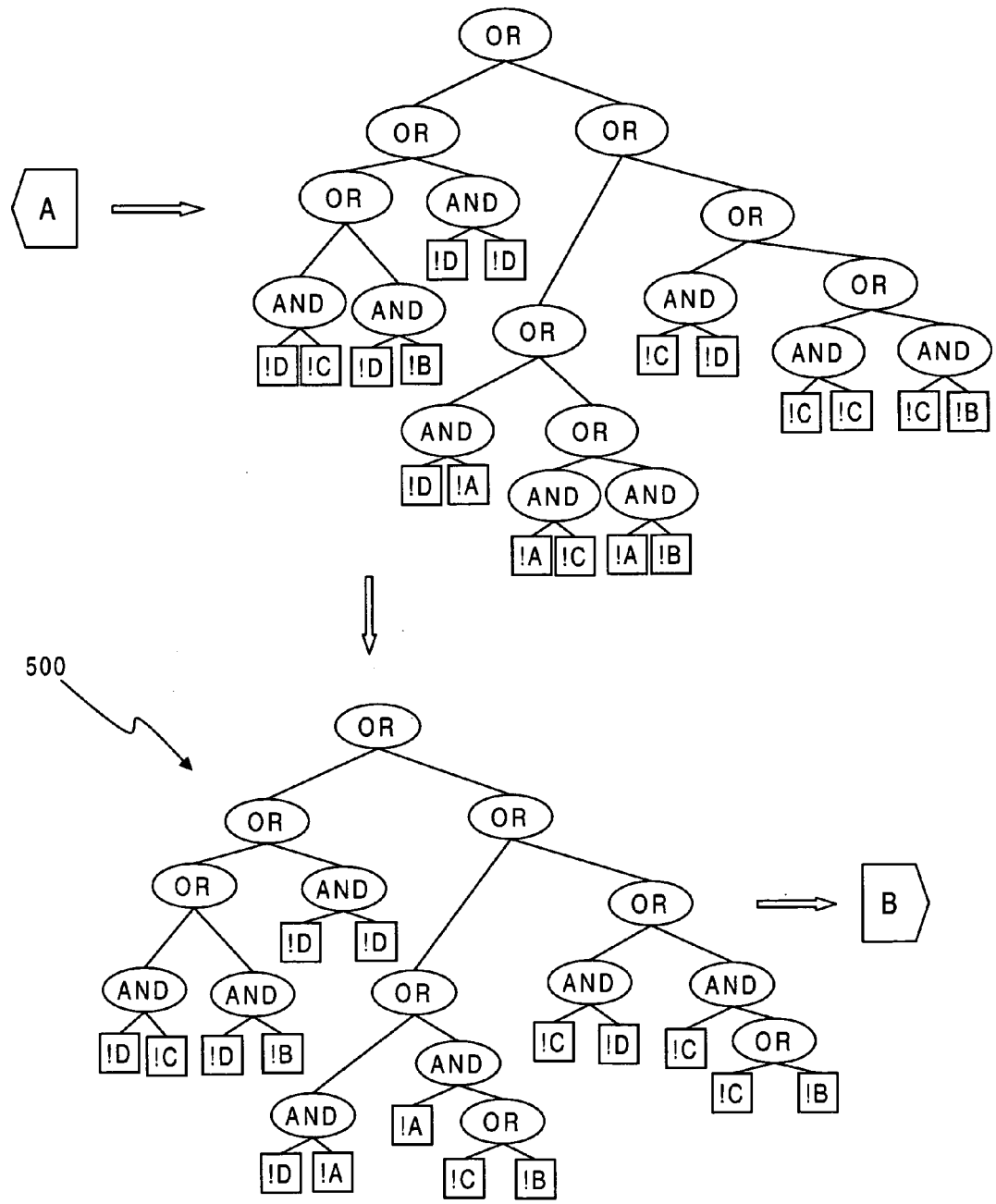
FIG. 5 illustrates a portion of a process to convert binary tree boolean expression into a normal form.
Figure 6:
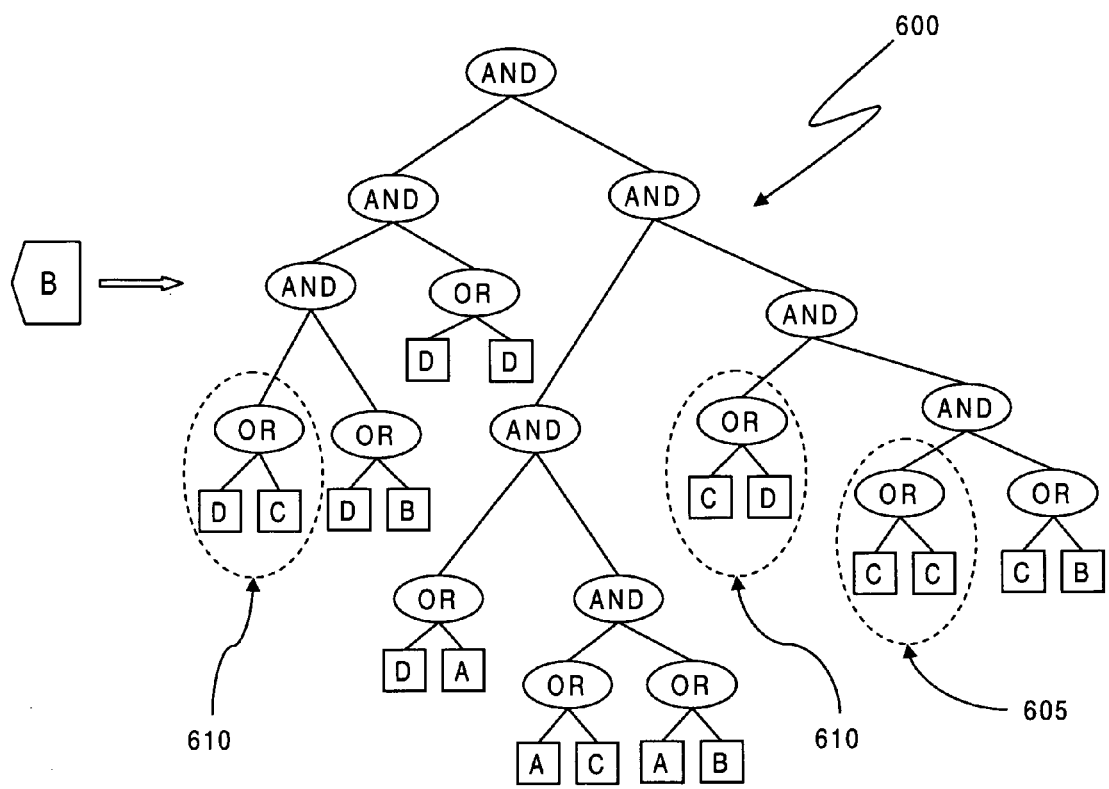
FIG. 6 illustrates a portion of a process to convert binary tree boolean expression into a normal form.

Referring to FIGS. 4-6, illustrating the steps to convert a logical formula expression into its DNF equivalent. As shown in FIGS. 4-6, the logical formula expression is converted into it DNF equivalent by application of DeMorgan's Law and distribution laws in elementary logic. It is important to note that DNF is generous with operators while very strict about nesting: a single level of disjunction and a single level of conjunction within each disjunct. Accordingly, upon reaching a single level of nesting 500 and converting the DNF to the CNF form by creating the negated expression, it quickly becomes apparent that the process may produce a normal form 600 with redundant or duplicate elements, like a duplicate literal 605 or a duplicate term 610, for example. With these elements, it is important to simplify the DNF and the therefore the resulting CNF which it is based upon.

Figure 7:
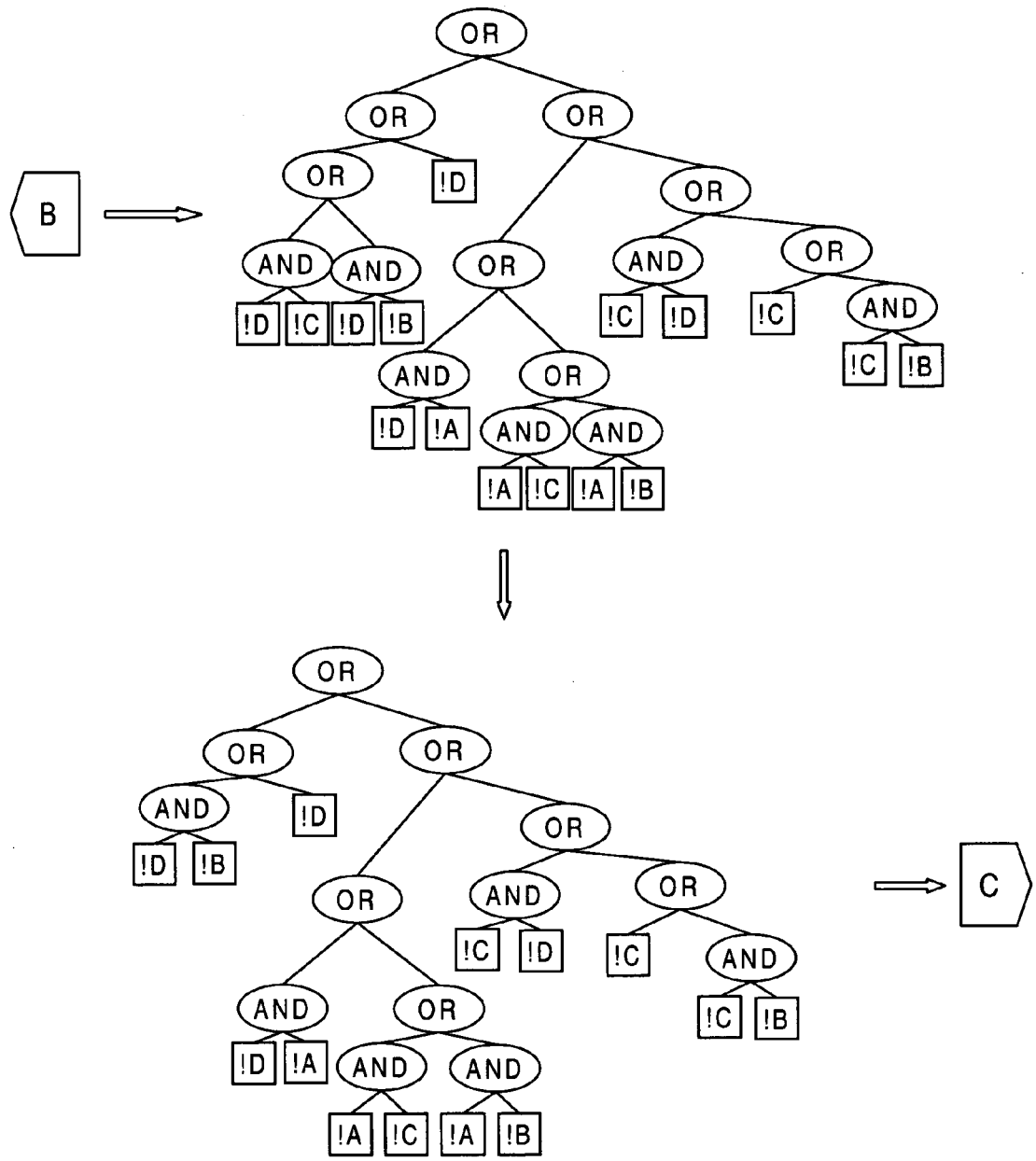
FIG. 7 illustrates a portion of a process convert binary tree boolean expression into a normal form.
Figure 8:
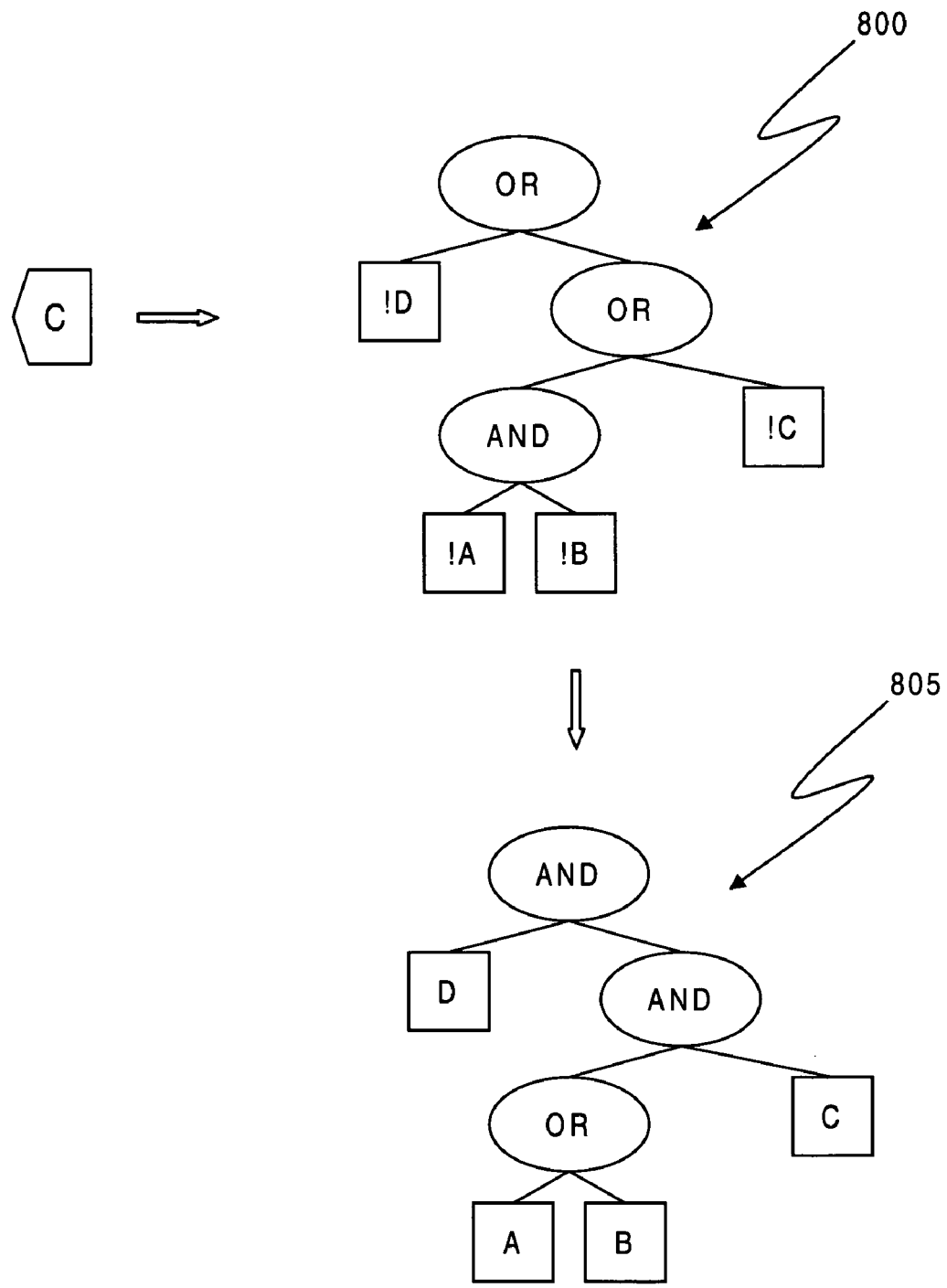
FIG. 8 illustrates a portion of a process to simplify a normal form.

Referring to FIGS. 7 & 8, illustrating the steps to simplifying the DNF. As show in FIGS. 7 & 8, it is important to simplify the DNF for increased performance returning to the single level of nesting 500, continue by eliminating any of the duplicate literals 605, generally illustrated at 700. Next, eliminate irrelevant terms, i.e., those terms that contain complementary (e.g., a AND !a) or otherwise unsatisfiable literals ("length GREATER 10 m AND length LESS 8 m"). After that, all of the duplicate terms 610 are removed, generally illustrated at 705. Next, irrelevant literals are removed according to an implementation of the Theorem of Consensus, a well known technique to simplify boolean logic, and also take into consideration a set of dependency rules. Following the implementation of the Theorem of Consensus, eliminate a term $t_i$ with literals $l_i$, if a term $t_j$ with literals $l_j$ exists where $l_i$ and $l_j$ are identical sets with the exception of a single literal $l_{ii}$ and $l_{jj}$ in each set where $l_{ii}$=NOT $l_{jj}$. It is important to test whether $l_{ii}$ OR $l_{jj}$==TRUE, which is always the case if $(l_{ii})$==NOT $(l_{jj})$. Alternatively, it is also TRUE in other cases like LENGTH>5 OR LENGTH<10, where the two literals are $l_{ii}$:=LENGTH>5 and $l_{jj}$:=LENGTH<10 that is equivalent to $(l_{ii})$!=NOT $(l_{jj})$ while the following $l_{ii}$ OR $l_{jj}$==TRUE is valid. The two terms containing $l_{ii}$ and $l_{jj}$ can be simplified based on the Theorem of Consensus that provides more checks to simplify when starting with a full minterm table where it is sufficient to only check for an overlap of one single literal.

If such a term $t_i$ exists, it can be eliminated after the literal $l_{jj}$ is removed from term $t_j$. If eliminating a literal empties term $t_i$, the expression is always false. If at least on literal was removed from some term in this step, the simplification may repeat the prior step. Continuing, if for each literal $l_i$ in term $t_i$ another term $t_j$ exists that contains a literal $l_j$=NOT $l_i$, the expression is always false. And finally, eliminate term $t_i$ if its set of literals $l_i$ fully includes the set of literals $l_j$ of another term $t_j$ as generally illustrated at 800.

The usage condition in the simplified DNF form is converted into its corresponding CNF form of ((a OR b) AND c) AND d, generally illustrated at 805. Note that the final logical expression is the same as the beginning logical expression, which illustrates that nothing is lost in the translation into normal form and subsequent minimization. In practice, however, logical expressions are more realistically hundreds of lines long with thousands of literals. Following the techniques disclosed in the preferred embodiment, the resulting logical expression of prime implicants is a fraction the length, for example 20 lines, that directly improves computability and therefore performance.

The simplified form represents the Boolean condition as a list of clauses ($c_1 \ldots c_n$) combined through an AND operator, where each clause contains one or more option literals ($l_i \ldots l_n$) that are combined through an OR operator. The literals may come in one of two forms: "featurefamily EQUAL value" and "NOT featurefamily EQUAL value." Feature and featurefamily are used interchangeably for features that are not a member of any feature family, i.e., they are standalone features. Standalone features always have two values indicating whether the feature is selected or no, e.g., on/off, yes/no, present/absent, etc. Should the literal be an inequality literal, e.g., length LESS THAN 10 m, then it is persisted as the list of enumerated feature literals that satisfy this expression and using the list of features that has been made available on the product via the product variability, e.g., OR(length EQUAL 8 m, length EQUAL 9.8 m, . . . , length EQUAL 1 m). Accordingly, usage conditions that contain inequality literals need to be expanded again into the applicable enumerated features, if a new value is added to the product variability for one of the feature families of the usage conditions references.

The result is that each column in the minterm table represents a logical expression that is equivalent to a boolean variable, e.g., "Engine==110 H.P." Product Configurators organize product features into variant options, which may be grouped into option families. This organization creates a set of interdependencies between these literals, or Boolean variables. In 1854, George Boole showed that his Boolean Algebra represents Aristotle's axioms (340 BC), the principle of non-contradiction, the law of excluded middle, and the law of identity.

Applying these axioms, the following rules apply: (1) the solution set for an AND combination of two logical expressions is the intersection of the solution sets of each individual expression, such that AND combinations of logical expressions are FALSE if any two of the individual solution sets don't intersect, and AND combinations of two logical expressions A and B are equivalent to expression A, if the solution set for expression A is a subset of the solution set for expression B; (2) the solution set for an OR combination of two logical expressions is the union of the solution sets of each individual expression, such that OR combinations of logical expressions are TRUE if the solution set for one expression is identical to the solution set of the negated version of the rest, i.e., if the solution sets are complementary, and OR combinations of two logical expressions A and B are equivalent to expression A, if the solution set for expression A is a superset of the solution set for expression B, and (3) two logical expressions are equivalent if they have identical solution sets.

Given the above rules and a complete enumeration of variant option values available for a given product family, transform the minterm table into a table in positional cube notation that uses only "1" and "-" and no "0" given that each option family requires a value to be chosen, as illustrated in Tables 3 & 4.

TABLE 3

Converted Part Quantity Table

| Condition | Wheel Quantity part BOM | Spare Tire Yes | Spare Tire None | Dual Tire Yes | Dual Tire None |
|---|---|---|---|---|---|
| C1 | 4 parts | — | 1 | — | 1 |
| C2 | 5 parts | 1 | — | — | 1 |
| C3 | 6 parts | — | 1 | 1 | — |
| C4 | 7 parts | 1 | — | 1 | — | and

TABLE 4

Converted CAD Quantity Table

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C5 | 2 front wheels | — | — | — | — | — | — | — |
| C6 | 2 (inner) rear wheels | — | — | — | — | — | — | 1 |
|  | 2 (inner) rear wheels | — | — | — | — | — | 1 | — |
| C7 | 2 (inner) rear wheels | — | — | — | — | 1 | — | — |
|  | 2 (inner) rear wheels | — | — | — | — | — | 1 | — |
| C8 | 2 outer rear wheels | — | — | 1 | — | — | — | 1 |
|  | 2 outer rear wheels | — | — | 1 | — | — | 1 | — |
| C9 | 2 outer rear wheels | — | — | 1 | — | 1 | — | — |
|  | 2 outer rear wheels | — | — | 1 | — | — | 1 | — |
| C10 | 1 spare wheel | 1 | — | — | — | — | — | 1 |
|  | 1 spare wheel | 1 | — | — | — | — | 1 | — |

Furthermore, enhance the value of the list of product families with the addition of the "None" value where a product configurator defines this variant option as non-obligatory, meaning the product family does not require this value to be selected. This option is equivalent to selecting the "None" value when not selecting any of the original option values.

According to the techniques discussed herein, applying Equation 2 to tables 3 & 4, results in Tables 5-8 where strike-outs indicate unsatisfiable conditions.

TABLE 5

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C1 * C5 | 2 front wheels | — | 1 | — | 1 | — | — | — |
| C1 * C6 | 2 (inner) rear wheels | — | 1 | — | 1 | — | — | 1 |
|  | 2 (inner) rear wheels | — | 1 | — | 1 | — | 1 | — |
| C1 * C7 | 2 (inner) rear wheels | — | 1 | — | 1 | 1 | — | — |
|  | 2 (inner) rear wheels | — | 1 | — | 1 | — | 1 | — |
| ~~C1*C8~~ | ~~2 outer rear wheels~~ | — | + | + | + | — | — | + |
|  | ~~2 outer rear wheels~~ | — | + | + | + | — | + | — |
| ~~C1*C9~~ | ~~2 outer rear wheels~~ | — | + | + | + | + | — | — |
|  | ~~2 outer rear wheels~~ | — | + | + | + | — | + | — |
| ~~C1*C10~~ | ~~1 spare wheel~~ | + | + | — | + | — | — | + |
|  | ~~1 spare wheel~~ | + | + | — | + | — | + | — |

TABLE 6

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C2 * C5 | 2 front wheels | 1 | — | — | 1 | — | — | — |
| C2 * C6 | 2 (inner) rear wheels | 1 | — | — | 1 | — | — | 1 |
|  | 2 (inner) rear wheels | 1 | — | — | 1 | — | 1 | — |
| C2 * C7 | 2 (inner) rear wheels | 1 | — | — | 1 | 1 | — | — |
|  | 2 (inner) rear wheels | 1 | — | — | 1 | — | 1 | — |
| ~~C2*C8~~ | ~~2 outer rear wheels~~ | + | — | + | + | — | — | + |
|  | ~~2 outer rear wheels~~ | + | — | + | + | — | + | — |
| ~~C2*C9~~ | ~~2 outer rear wheels~~ | + | — | + | + | + | — | — |
|  | ~~2 outer rear wheels~~ | + | — | + | + | — | + | — |
| C2 * C10 | 1 spare wheel | 1 | — | — | 1 | — | — | 1 |
|  | 1 spare wheel | 1 | — | — | 1 | — | 1 | — |

TABLE 7

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C3 * C5 | 2 front wheels | — | 1 | 1 | — | — | — | — |
| C3 * C6 | 2 (inner) rear wheels | — | 1 | 1 | — | — | — | 1 |
|  | 2 (inner) rear wheels | — | 1 | 1 | — | — | 1 | — |
| C3 * C7 | 2 (inner) rear wheels | — | 1 | 1 | — | 1 | — | — |
|  | 2 (inner) rear wheels | — | 1 | 1 | — | — | 1 | — |
| C3 * C8 | 2 outer rear wheels | — | 1 | 1 | — | — | — | 1 |
|  | 2 outer rear wheels | — | 1 | 1 | — | — | 1 | — |

TABLE 7-continued

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C3 * C9 | 2 outer rear wheels | — | 1 | 1 | — | 1 | — | — |
|  | 2 outer rear wheels | — | 1 | 1 | — | — | 1 | — |
| ~~C3*C10~~ | ~~1 spare wheel~~ | + | + | + | — | — | — | + |
|  | ~~1 spare wheel~~ | + | + | + | — | — | + | — |

TABLE 8

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C4 * C5 | 2 front wheels | 1 | — | 1 | — | — | — | — |
| C4 * C6 | 2 (inner) rear wheels | 1 | — | 1 | — | — | — | 1 |
|  | 2 (inner) rear wheels | 1 | — | 1 | — | — | 1 | — |
| C4 * C7 | 2 (inner) rear wheels | 1 | — | 1 | — | 1 | — | — |
|  | 2 (inner) rear wheels | 1 | — | 1 | — | — | 1 | — |
| C4 * C8 | 2 outer rear wheels | 1 | — | 1 | — | — | — | 1 |
|  | 2 outer rear wheels | 1 | — | 1 | — | — | 1 | — |
| C4 * C9 | 2 outer rear wheels | 1 | — | 1 | — | 1 | — | — |
|  | 2 outer rear wheels | 1 | — | 1 | — | — | 1 | — |
| C4 * C10 | 1 spare wheel | 1 | — | 1 | — | — | — | 1 |
|  | 1 spare wheel | 1 | — | 1 | — | — | 1 | — |

For each of the multiplied tables, Tables 5-8, above, the preferred embodiment loops through the various rows to build a list of primitives, where each primitive has: a row of the table, summarized quantity, summarized overlapping quantity, and a flag as to whether the primitive is redundant.

Figure 9A:
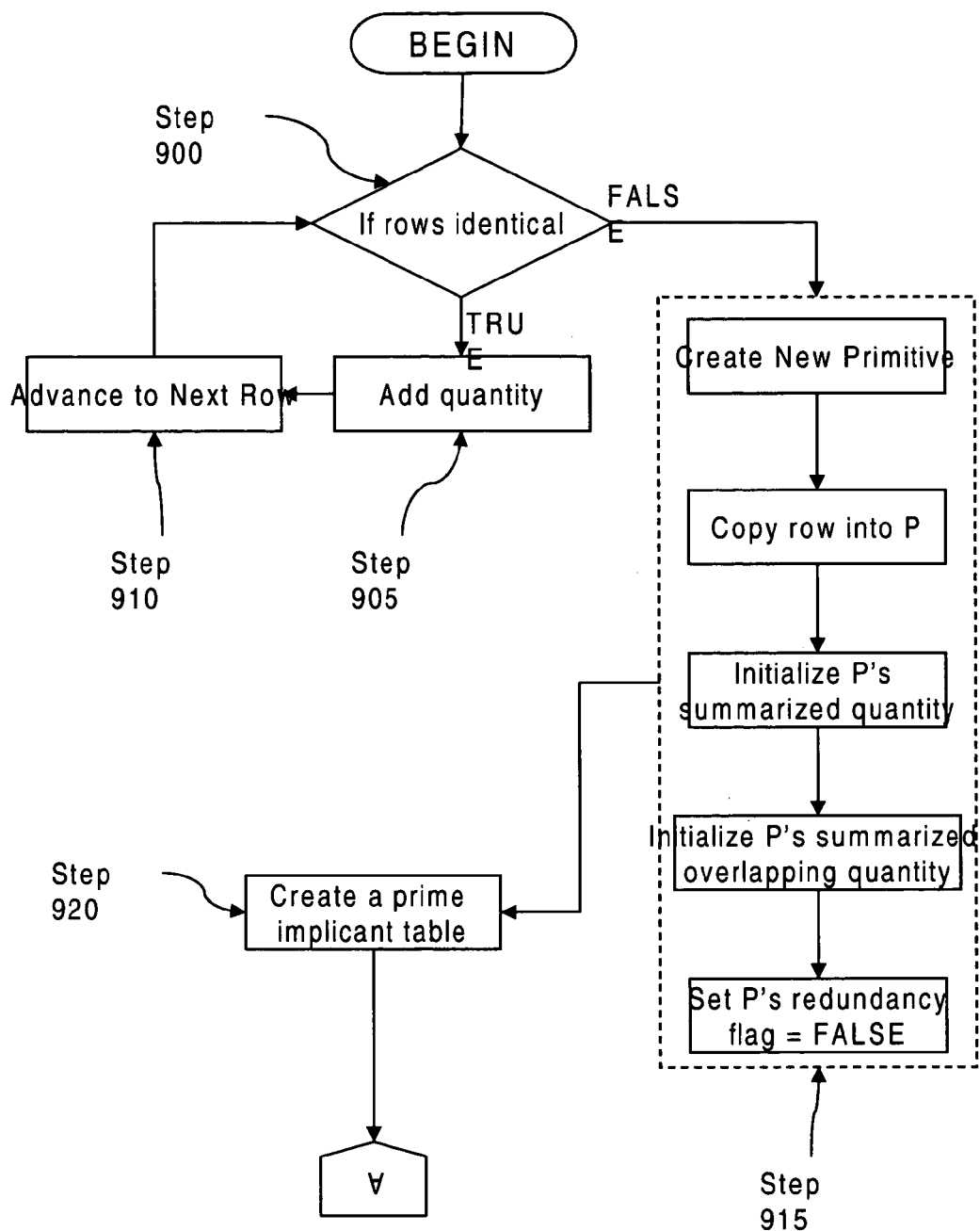
FIG. 9 illustrates a portion of a process to simplify a normal form.
Figure 9B:
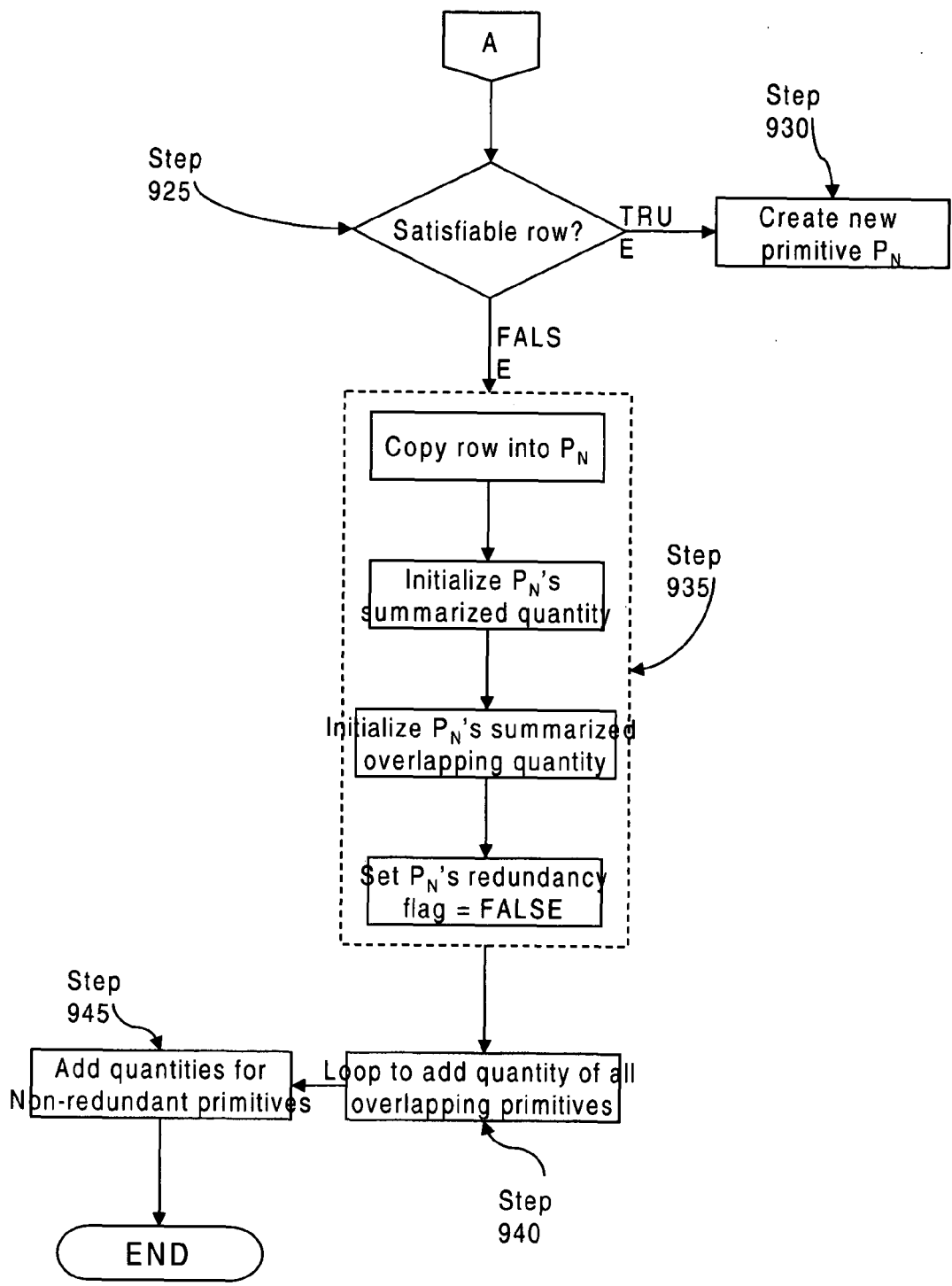

Referring to FIG. 9, if a row of the multiplied table is identical to the table row for one of the primitives (Step 900), add the quantity configured by the row in that multiplied table (Step 905) and advances on to the next row in the multiplied table (Step 910). Otherwise, if none of the primitives match the row at hand, then create new primitive P, copy the row at hand into P, initialize P's summarized quantity to the quantity configured by the row at hand, initialize P's summarized overlapping quantity to 0.0, and initialize P's redundancy flag to FALSE (Step 915). Next, negate the logical expression in primitive P, multiply (logical AND) it with the quantity expression of the first product representation (C1), and create a prime implicant table in Positional Cube Notation (PCN) that only uses "1" and "-" and is expanded into full product variability, as illustrated in Steps 900 to 915, above, for the resulting expression (Step 920). For each satisfiable row (Step 925), create a new primitive $P_N$ if no equivalent primitive exists yet (equivalence between rows is given if the PCN of the two rows is identical) (Step 930), otherwise copy the current row at hand from the PCN table of the negated expression into the new $P_N$, initialize $P_N$'S summarized quantity to 0.0, initialize $P_N$'S summarized overlapping quantity to 0.0, and initialize $P_N$'s redundancy flag to FALSE (Step 935), resulting in Tables 9 & 10, from the disclosed example.

TABLE 9

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C1 * C5 | 2 front wheels | — | 1 | — | 1 | — | — | — |
| P1 | 2 front wheels Quantity: 1.0 Overlap: 0.0 | — | 1 | — | 1 | — | — | — |
| ~~P1$_N$~~ | ~~2 front wheels Quantity: 0.0 Overlap: 0.0~~ | + | + | — | + | — | — | — |
| ~~P1$_N$~~ | ~~2 front wheels Quantity: 0.0 Overlap: 0.0~~ | — | + | + | + | — | — | — |

TABLE 10

| Condition | Wheel Quantity CAD structure | Spare Tire Yes | Spare Tire None | Dual Tire Yes | Dual Tire None | Short Wheel base | Medium Wheel base | Long Wheel base |
|---|---|---|---|---|---|---|---|---|
| C1 * C6 | 2 (inner) rear wheels | — | 1 | — | 1 | — | — | 1 |
| P2 | 2 (inner) rear wheels Quantity: 1.0 Overlap: 0.0 | — | 1 | — | 1 | — | — | 1 |
| ~~P2_N~~ | ~~2 (inner) rear wheels Quantity: 1.0 Overlap: 0.0~~ | + | + | — | + | — | — | — |
| ~~P2_N~~ | ~~2 (inner) rear wheels Quantity: 1.0 Overlap: 0.0~~ | — | + | + | + | — | — | — |
| $P2_1$ | 2 (inner) rear wheels Quantity: 0.0 Overlap: 0.0 | — | 1 | — | 1 | 1 | — | — |
| $P2_2$ | 2 (inner) rear wheels Quantity: 0.0 Overlap: 0.0 | — | 1 | — | 1 | — | 1 | — |

Accordingly, when all primitives have been determined, loop through and add quantities for all overlapping primitives to total summarized overlapping quantity. A primitive P2 overlaps P1 if the solution set of P2 is a subset of the solution set of P1, if P1 & P2==P1 is satisfied, where Overlapping primitives are marked as redundant and excluded from future processing (Step 940). Finally, add summarized quantity and summarized overlap quantity for each redundant primitive (Step 945). If the two product representations are completely aligned, the above steps produce the same quantity for each non-redundant primitive that is also found on the quantity expression of the first product representation (C1). If the quantities are not identical, the condition represented by the mismatching primitive is a clause of $C_M$ and the quantity difference shows by how much the quantities mismatch for that clause of $C_M$.

In the above example, primitive $P2_2$ shows a quantity difference of +2.0 which means that "No Spare Tire, No Dual Tire" vehicles with Medium Wheelbase should have 4 wheels but have 6 wheel positions, as seen in Table 11.

TABLE 11

| C1 * C5 | 2 front wheels |
|---|---|
| C1 * C6 | 2 (inner) rear wheel positions |
| C1 * C7 | 2 (inner) rear wheel positions |

None of the Dual Tire vehicle primitives, as well as the Short Wheelbase vehicle with Single Tire primitive, have a spare tire position.

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A method of determining a quantity mismatch report in a data processing system so that a plurality of configured quantities for a plurality of product variants in a product lifecycle management system can be compared, comprising:
    transforming a plurality of logical expressions by the data processing system, wherein the plurality of logical expressions relate a first plurality of quantity conditions from a first element of the product lifecycle management system to a second plurality of quantity conditions from a second element of the product lifecycle management system;

detecting a quantity mismatch report from the transformed logical expressions by the data processing system, wherein the quantity mismatch report indicates that whether a variant condition configuring a given instance quantity in a first product representation of a configuration is identical to a sum of instances in another product representation of the configuration; and determining at least one product variant from the quantity mismatch report by the data processing system.

2. The method of claim 1, wherein transforming a plurality of logical expressions comprises subtracting a first logical expression from a second logical expression using a truth table, whereby a combination of lines in the truth table having a true expression is translated into a minterm table.

3. The method of claim 2, wherein transforming a plurality of logical expressions further comprises minimizing the minterm table by calculating a plurality of prime implicants.

4. The method of claim 1, wherein detecting a quantity mismatch report utilizes a prime implicant table in positional cube notation to identify a plurality of equivalent primitives.

5. The method of claim 4, wherein the prime implicant table in positional cube notation represents a full product variability.

6. The method of claim 1, wherein transforming the plurality of logical expressions includes representing the logical expressions as a binary tree and recursively traversing the binary tree.

7. A non-transitory machine readable medium encoded with executable instructions that, when executed, cause a data processing system to perform the steps of:

transforming a plurality of logical expressions, wherein the plurality of logical expressions relate a first plurality of quantity conditions from a first element of the product lifecycle management system to a second plurality of quantity conditions from a second element of the product lifecycle management system;

detecting a quantity mismatch report from the transformed logical expressions, wherein the quantity mismatch report indicates that whether a variant condition configuring a given instance quantity in a first product representation of a configuration is identical to a sum of instances in another product representation of the configuration; and determining at least one product variant from the quantity mismatch report.

8. The machine readable medium of claim 7, wherein the instructions for transforming comprise instructions for subtracting a first logical expression from a second logical expression using a truth table, wherein a combination of lines in the truth table having a true expression is translated into a minterm table.

9. The machine readable medium of claim 8, wherein the instructions for transforming further comprise instructions for minimizing the minterm table by calculating a plurality of prime implicants.

10. The machine readable medium of claim 9, wherein the prime implicant table in positional cube notation represents a full product variability.

11. The machine readable medium of claim 7, wherein the instructions for detecting utilize a prime implicant table in positional cube notation to identify a plurality of equivalent primitives.

12. The machine readable medium of claim 7, wherein transforming the plurality of logical expressions includes representing the logical expressions as a binary tree and recursively traversing the binary tree.

13. A data processing system, comprising: a processor; and an accessible memory, the data processing system configured to implement a method to determine a quantity mismatch report in a product lifecycle management system by performing the steps of:

transforming a plurality of logical expressions, wherein the plurality of logical expressions relate a first plurality of quantity conditions from a first element of the product lifecycle management system to a second plurality of quantity conditions from a second element of the product lifecycle management system;

detecting a quantity mismatch report from the transformed logical expressions, wherein the quantity mismatch report indicates that whether a variant condition configuring a given instance quantity in a first product representation of a configuration is identical to a sum of instances in another product representation of the configuration; and determining at least one product variant from the quantity mismatch report.

14. The data processing system of claim 13, wherein transforming the plurality of logical expressions includes representing the logical expressions as a binary tree and recursively traversing the binary tree.

15. The data processing system of claim 13, wherein the process of detecting uses a prime implicant table in positional cube notation to identify a plurality of equivalent primitives.

16. The data processing system of claim 15, wherein the prime implicant table in positional cube notation represents a full product variability.

17. A method of determining a quantity mismatch report in a data processing system, comprising:

transforming a plurality of logical expressions by the data processing system, wherein the plurality of logical expressions relate a first plurality of quantity conditions from a first element of the product lifecycle management system to a second plurality of quantity conditions from a second element of the product lifecycle management system, by:

subtracting a first logical expression from a second logical expression using a truth table, whereby a combination of lines in the truth table having a true expression is translated into a minterm table, and minimizing the minterm table by calculating a plurality of prime implicants;

detecting a quantity mismatch report from the transformed logical expressions using a prime implicant table in positional cube notation to identify a plurality of equivalent primitives, wherein the quantity mismatch report indicates that whether a variant condition configuring a given instance quantity in a first product representation of a configuration is identical to a sum of instances in another product representation of the configuration; and determining at least one product variant from the quantity mismatch report.

* * * * *